United States Patent [19]
Schauder

[11] Patent Number: 5,182,508
[45] Date of Patent: Jan. 26, 1993

[54] RECONFIGURABLE AC INDUCTION MOTOR DRIVE FOR BATTERY-POWERED VEHICLE

[75] Inventor: Colin D. Schauder, Murrysville, Pa.

[73] Assignee: Westinghouse Electric Corp., Pittsburgh, Pa.

[21] Appl. No.: 870,643

[22] Filed: Apr. 16, 1992

[51] Int. Cl.⁵ .............................................. H02P 7/00
[52] U.S. Cl. ................................... 318/801; 318/139; 318/52
[58] Field of Search ................. 318/727, 254, 792–801, 318/802–812, 140, 146, 139, 147, 148, 149, 151, 154, 52, 599, 607, 608, 258, 650, 138, 719, 723, 439; 307/52, 60, 66, 67, 87; 363/159, 160, 164, 58, 37, 40, 13, 15

[56] References Cited

U.S. PATENT DOCUMENTS

| | | | |
|---|---|---|---|
| 3,843,912 | 10/1974 | Anderson | 318/258 |
| 4,010,407 | 3/1977 | Lombard | 318/139 |
| 4,052,647 | 10/1977 | Thompson | 318/139 |
| 4,479,082 | 10/1984 | Schauder et al. | |
| 4,616,166 | 10/1986 | Cooper et al. | 318/723 X |
| 4,697,131 | 9/1987 | Schauder et al. | |
| 4,698,562 | 10/1987 | Gale et al. | 318/254 |
| 4,707,651 | 11/1987 | Schauder | |
| 4,713,745 | 12/1987 | Schauder | |
| 4,849,651 | 7/1989 | Estes, Jr. | 307/66 X |
| 4,862,054 | 8/1989 | Schauder | |
| 4,885,518 | 12/1989 | Schauder | |
| 4,959,595 | 9/1990 | Nishimura | 318/138 |
| 4,959,602 | 9/1990 | Scott et al. | |
| 4,962,339 | 10/1990 | Schauder | |
| 5,005,115 | 4/1991 | Schauder | |

Primary Examiner—A. Jonathan Wysocki

[57] ABSTRACT

A drive system for a battery-powered vehicle is selectively operable in either a drive mode or an alternative battery-charging mode. In the drive mode, vector control circuitry is used to control instantaneous stator currents in an AC induction motor. The motor is preferably constructed having a pair of separately excitable three-phase windings spatially displaced by thirty electrical degrees. In the battery-charging mode, many of the same components are used to control battery charging current obtained as AC from a typical AC mains source.

15 Claims, 4 Drawing Sheets

RECONFIGURABLE AC INDUCTION MOTOR DRIVE FOR BATTERY-POWERED VEHICLE

BACKGROUND OF THE INVENTION

1. Field Of The Invention

The present invention relates to drive systems for battery-powered vehicles. More particularly, the invention relates to a battery-powered vehicle drive selectively operable in a normal drive mode or an alternative battery charging mode.

2. Description of the Prior Art

The development of practical battery-powered vehicles for everyday use has presented a number of substantial technical challenges. Particularly, it is important that the vehicle be as efficient as possible in order to extend operating range. This has made weight reduction a primary concern. Also, the vehicle must be able to operate over a wide range of speed and torque requirements.

It is known that polyphase AC induction motors have relatively high efficiencies. Such motors can be adapted with appropriate control systems to have relatively fast and accurate operation and control. An effective control system which has been used in many induction motor applications is "vector control." In these systems, actual motor conditions are typically compared with instantaneous demand signals. Error signals thus produced are processed and converted to polyphase currents needed by the motor to produce a desired torque and magnetic flux density.

No matter how efficient an electric vehicle is made, inevitably the storage batteries must be recharged. This has often required special external equipment. Thus, in order to increase the feasibility of such vehicles, it is desirable that the circuitry necessary to recharge the batteries be carried "on-board." This allows the vehicle to be recharged at virtually any location where electric power is available. Typical charging systems added to a vehicle, however, simply increase overall weight. Thus, improvements in convenience have been at the expense of weight which causes an increase in acceleration times and a reduction of vehicle range.

SUMMARY OF THE INVENTION

Drives for battery powered vehicles practicing the present invention have switching means to provide selective operation in either a drive mode or an alternative battery charging mode. In the drive mode, a vector control apparatus is utilized to control instantaneous stator currents in an AC induction motor. In presently preferred embodiments, the motor is constructed having a pair of separately excitable three-phase windings which are not directly electrically connected and are spatially displaced by thirty electrical degrees. This configuration makes it possible to excite the motor with the outputs of two separate three-phase inverters. Thus, the motor can produce a power corresponding to the sum of the power output of each of the inverters, without the need to directly connect power switching devices in parallel. In such embodiments, the vector control apparatus utilizes a motor torque and flux controller to produce a pair of drive current reference vector signals as well as a positional reference slip angle signal. The current reference vector signals preferably have a thirty degree phase difference when a two winding motor is utilized.

The drive current reference vector signals are applied to a reconfigurable compensation means where they are compared with signals representative of actual stator currents. Error signals thus generated are compensated in a synchronously rotating reference frame to produce inverter voltage control signals. Firing circuit means receive the inverter voltage control signals and produce switching signals to operate reconfigurable inverter means. When a two-winding motor is used, the switching signals are preferably provided by a pair of pulse width modulators to a pair of inverters. Each inverter produces three phase AC for an associated motor winding. The thirty degree phase difference in the drive current reference vector signals produces stator currents having a corresponding phase difference. This results in coincidence of the MMFs of the two windings.

In the alternative battery charging mode, many of the same components used in the drive mode are utilized to facilitate recharging of the vehicle storage batteries at convenient locations. Here, a battery charging controller produces charging reference vector signals. Preferably, one of the charging reference vector signals has a magnitude varying sinusoidally at the frequency of the AC mains used as a charging energy source. The other signal is a complex constant vector signal. These signals are then compared with signals representative of actual charging conditions. Error signals thus produced are compensated and typically phase shifted by negative thirty degrees. The shifted error signals are then applied to the pulse width modulators. Firing signals activate the inverters to draw AC energy from an AC mains and apply it first to a storage capacitor. Charging current is then drawn off the capacitor and applied to charge the vehicle storage batteries.

DETAILED DESCRIPTION OF PRESENTLY PREFERRED EMBODIMENTS

In accordance with the invention a drive for a battery-powered vehicle may be provided which controls operation of an AC induction motor to give fast and accurate response to instantaneous demanded conditions. Preferably, the motor is constructed having a pair of separately excitable polyphase windings spatially offset by a predetermined angle and not directly electrically connected to each other. The drive is selectively reconfigurable to use much of the same circuitry to effectively facilitate recharging of the storage batteries from convenient AC energy sources.

Figure 1:
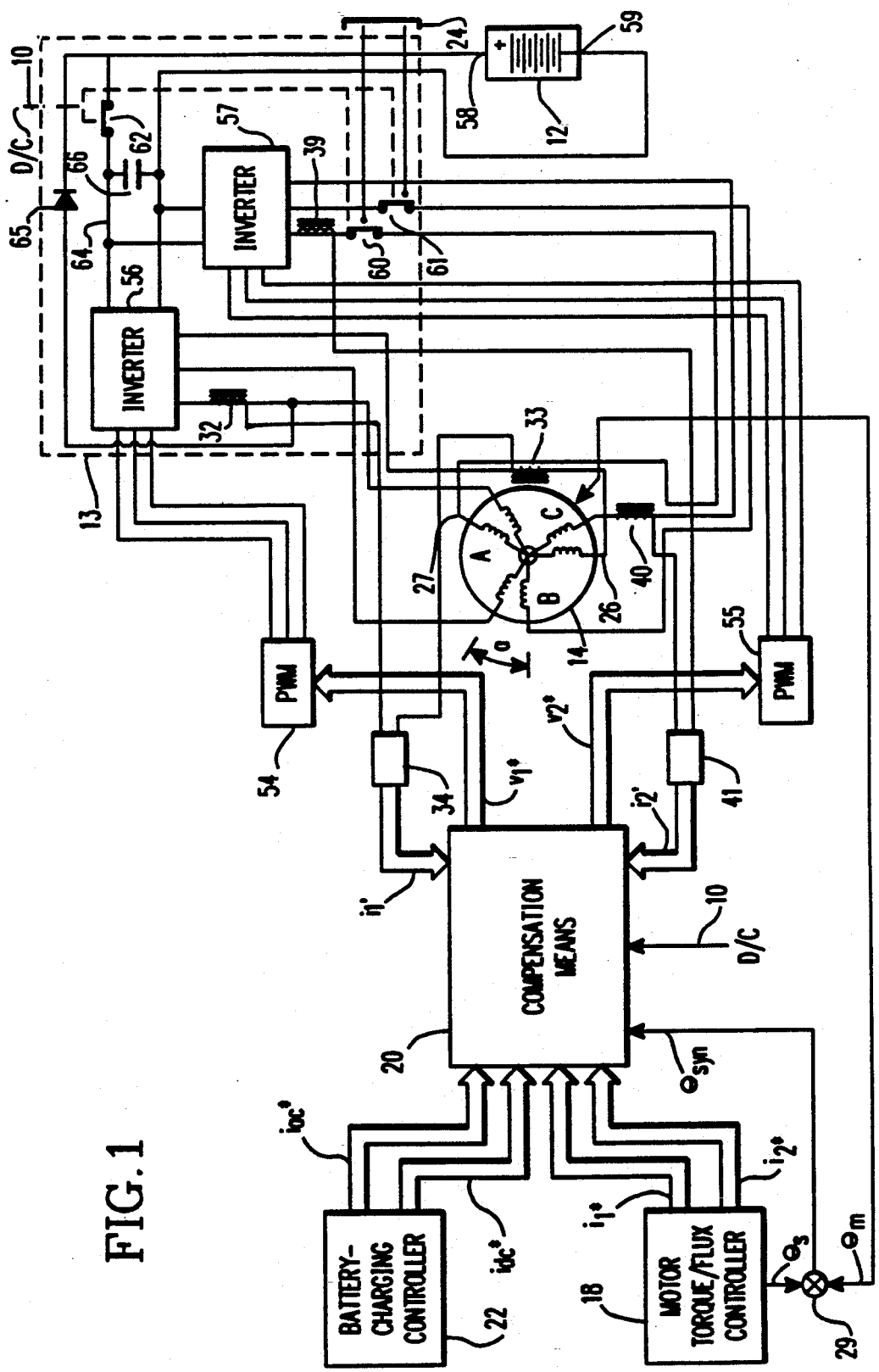
FIG. 1 is a diagrammatic representation of a presently preferred embediment of a battery powered vehicle drive constructed in accordance with the invention.

Referring to FIG. 1, a presently preferred drive is illustrated. The drive utilizes switching means 10 to effectuate operation in either the normal drive mode or the alternative battery-charging mode. Switching means 10 includes various switching elements which change the internal electrical paths within the drive. In the drive mode, DC energy is drawn from storage battery 12 and inverted to polyphase AC energy by inverter means 13 to power motor 14. A vector control provides operational characteristics unattainable with classical methods of voltage and frequency control. The vector control utilizes a motor torque/flux controller 18 to produce drive reference signals. The drive reference signals are received and processed by compensation means 20. Control signals thus produced are output to modulation and firing circuit means which control inverter means 13. In the alternative battery charging mode, motor torque/flux controller 18 is removed from the circuit. Instead, charging reference signals are applied by battery charging controller 22 to compensation means 20. In this mode, the compensation characteristics are reconfigured for battery charging requirements. Control signals produced by the compensation are passed to the modulation and firing circuit means as before. Inverter means 13, which has been reconfigured by switching means 10, draws AC power from AC means 24, converts it as charging current to DC and applies it to battery 12.

Figure 2A:
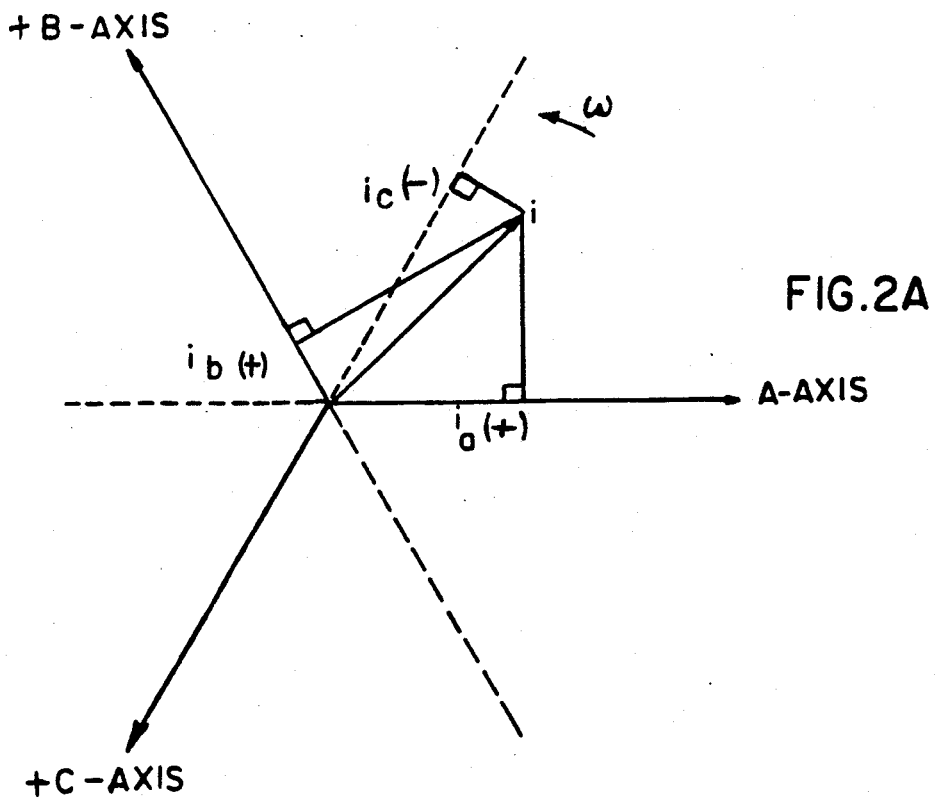
FIG. 2A is a vector representation of a three-phase instantaneous current set in terms of the phase variables.

Each winding of motor 14 should preferably be of three-phase, star-connected design. The three instantaneous phase currents in such a winding may be represented by a single two-dimensional vector (or complex number) as illustrated in FIG. 2A. The three phase currents represented by this vector are, by definition, equal to the vertical projections of the vector onto each of three axes (A, B, C) symmetrically arranged at a 120° displacement to each other in the complex plane. Under balanced conditions, the vector current "i" rotates with angular velocity $\omega$ equal to the AC frequency (expressed in rad/sec).

Under steady state balanced sinusoidal conditions, this rotating current produces a concurrent rotating magnomotive force (MMF) in the stator of the induction motor. In general, a particular angle of the current vector in the complex plane corresponds to a particular, unique, orientation of the MMF distribution in the air gap of motor 14. If the stator is provided with two windings 26 and 27 as shown, generally identical but physically rotated by an angle "a" of 30 electrical degrees (30 e°) relative to each other, then MMFs of each winding will coincide provided the two driving current vectors are given a similar 30° displacement of opposite sense in the complex plane. Thus, when both windings 26 and 27 are energized in this way, the combined fundamental MMF wave in the motor achieves maximum amplitude. Additionally, certain undesirable harmonics in the MMF distribution are also reduced with this arrangement.

Figure 2B:
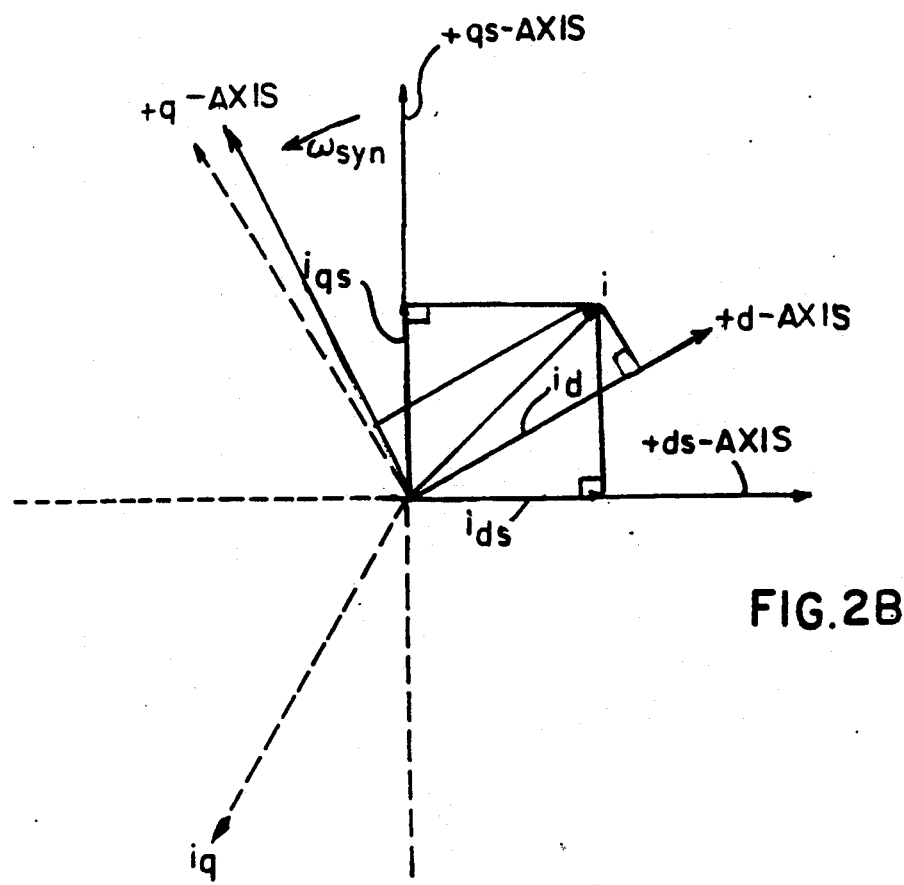
FIG. 2B is a graphical representation of the current vector of FIG. 2A in terms of cartesian components in a stationary reference frame and further illustrating the same current vector in a rotated reference frame.

The torque produced by an induction motor and the magnetic flux level in the machine can both be controlled dynamically by correctly controlling the stator current vector. Using modern control techniques, this can be done utilizing a rotating axis transformation. The concept of a rotating axis transformation can be understood with reference to FIG. 2B. Here, the stator current vector "i" seen in FIG. 2A is redefined in terms of a direct stationary (ds) axis and an orthogonal quadrature stationary (qs) axis to have components $i_{ds}$ and $i_{qs}$ respectively. Thus, a current which was previously defined in terms of three variables is now defined in terms of two. This relationship is illustrated mathematically as follows:

$$\begin{bmatrix} i_{ds} \\ i_{qs} \end{bmatrix} = \begin{bmatrix} 1 & 0 \\ \frac{-1}{\sqrt{3}} & \frac{-2}{\sqrt{3}} \end{bmatrix} \begin{bmatrix} i_a \\ i_c \end{bmatrix}$$

The two components, $i_{ds}$ and $i_{qs}$, can be regarded as the real and imaginary parts respectively of a complex number. The stator current vector i is thus defined as: $i = (i_{ds} + j i_{qs})$. Under balanced sinusoidal conditions, current vector i rotates in the complex plane with an angular frequency $\omega$ equal to the excitation frequency. Under this condition, $i = i_o e^{j\omega t}$, where $i_o$ is a complex constant. Multiplication of current vectors i by a complex quantity $e^{-j\omega_{syn}t}$ yields the complex quantity $i' = i_o e^{j(\omega - \omega_{syn})t}$. This is equivalent, in effect, to rotating the coordinate axes of the complex plane with angular frequency $\omega_{syn}$ and then expressing the current vector i in terms of its coordinates $i_d$ and $i_q$ relative to the new rotating axes.

The angular velocity, $\omega_{syn}$, of the reference frame should be chosen so that the reference frame, by definition, always rotates at an angular velocity exceeding the electrical angular velocity of the motor shaft by a desired slip frequency $\omega_s$ defined by motor torque/flux controller 18. If the rotational frequency, $\omega_{syn}$, of the reference frame is equal to the rotational frequency, $\omega$, of the current vector i, then current vector i' is equal to complex constant $i_o$. The following transformation may be used to re-obtain the instantaneous three phase coordinates:

If $i' = (i_d + j i_q)$, then $$\begin{bmatrix} i_a \\ i_c \end{bmatrix} = \begin{bmatrix} \cos(\omega_{syn}t) & -\sin(\omega_{syn}t) \\ \cos\left(\omega_{syn}t + \frac{2\pi}{3}\right) & -\sin\left(\omega_{syn}t + \frac{2\pi}{3}\right) \end{bmatrix} \begin{bmatrix} i_d \\ i_q \end{bmatrix}$$

$$i_b = -(i_a + i_c)$$

Since motor 14 has separate windings 26 and 27, many functions of the drive are arranged in parallel as will now be described. Referring again to FIG. 1, motor torque/flux controller 18 preferably produces a pair of drive reference current vector signals rotating in the synchronous reference frame. Current vector signal $i_1^*$ serves as a drive reference for motor winding 26. Similarly $i_2^*$ serves as a drive reference signal for winding 27. Preferably, signal $i_2^*$ has a phase difference with respect to $i_1^*$ of 30 e°. This can be accomplished by multiplying $i_1^*$ by the vector operator $e^{-j(\pi/6)}$.

Controller 18 further produces a signal $\Theta s$ which represent the accrued slip angle of the synchronous reference frame relative to the angular position $\Theta m$ of the rotor of motor 14. Angle $\Theta m$ is obtained by direct measurement from the rotor shaft. Angle $\Theta s$ is fed to summing junction 29 where it is added to $\Theta m$ to obtain a total synchronous angle $\Theta syn$. Signals $i_1^*$, $i_2^*$ and $\Theta syn$ are then fed to compensation means 20. A presently preferred motor torque and flux controller suitable for use with the present invention is disclosed in a concurrently filed application Ser. No. 07/870,645, entitled "Automatic Motor Torque and Flux Controller for Battery Powered Vehicle Drive," by Colin D. Schauder, which is incorporated herein by reference.

Figure 3:
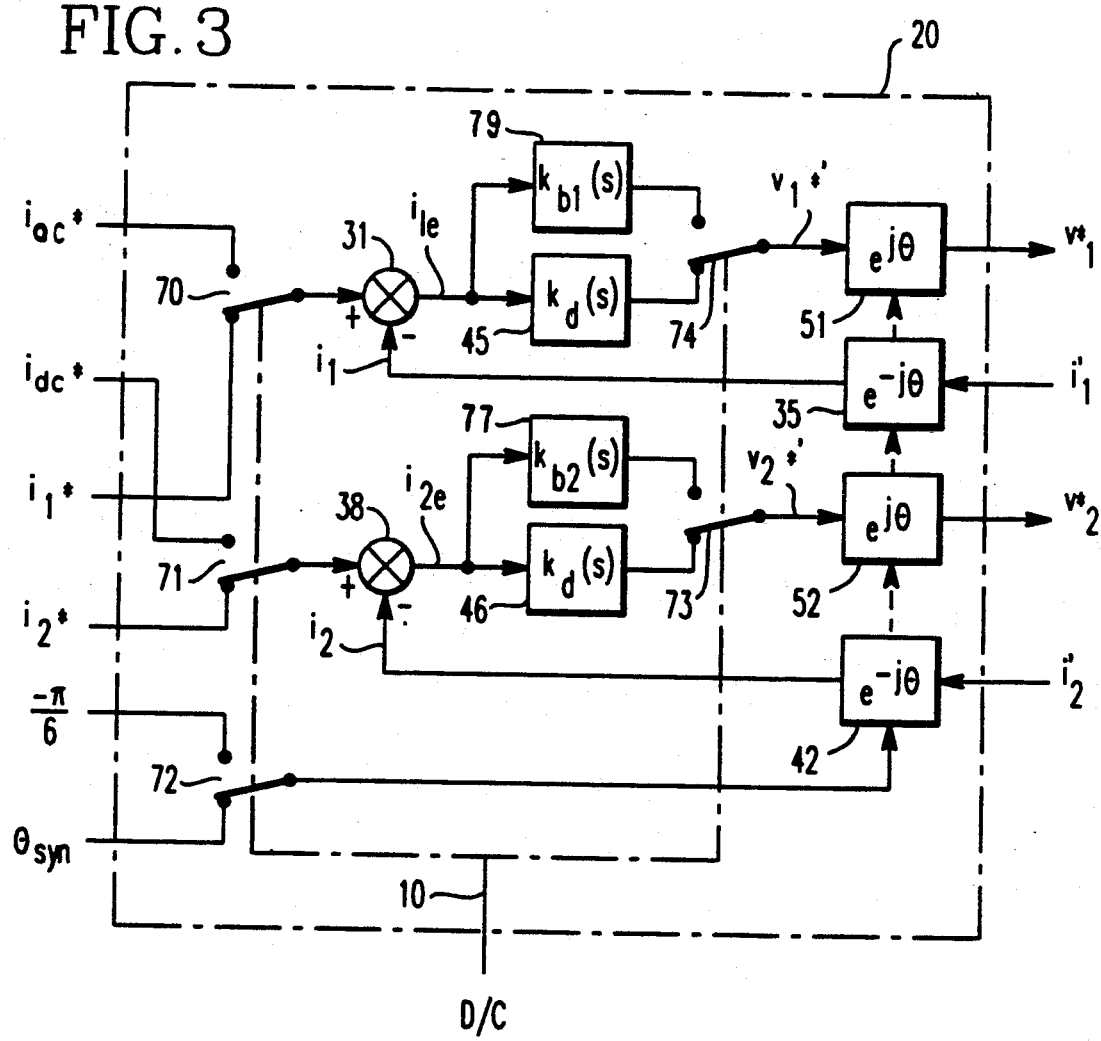
FIG. 3 is a diagrammatic view of a presently preferred embodiment of a reconfigurable compensation means constructed in accordance with the invention.

Referring to FIG. 3, differencing means first subtract the drive reference current vector signals from signals representative of actual stator currents. Specifically, a difference between $i_1^*$ and a current vector signal $i_1$ is obtained at differencing junction 31 to produce current error vector signal $i_{1e}$. Signal $i_1$ is obtained by first measuring the actual currents in the A and C phase of winding 26. Specifically, the A-phase current is measured by a current sensor such as current transformer 32 (FIG. 1). Similarly, the C-phase current may be measured by current transformer 33 (FIG. 1). Appropriate conversion may then be conducted at converter 34 to express current vector signal $i_1'$ in terms of the stationary axes ds and qs. Vector rotator 35 operates upon vector current signal $i_1'$ to produce synchronously rotating $i_1$. In a similar manner, a current error vector signal $i_{2e}$ is produced at differencing junction 38 by the difference of signal $i_2^*$ and a current vector signal $i_2$. Signal $i_2$ may be obtained via current sensors, such as current transformers 39 and 40 which are converted at converter 41 to produce current vector signal $i_2'$. This signal is then passed through vector rotator 42 to produce synchronously rotating signal $i_2$.

Figure 4:
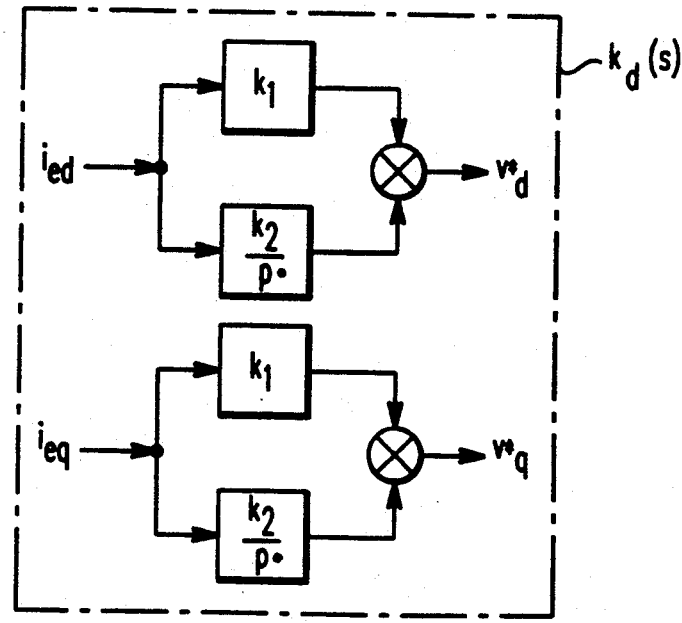
FIG. 4 is a diagrammatic view of a presently preferred transfer function for a drive error vector signal.

Current error vector signals $i_{1e}$ and $i_{2e}$ are compensated by compensators 45 and 46, respectively. Compensators 45 and 46 may have identical transfer functions generally expressed in the frequency domain as $k_d(s)$. Referring to FIG. 4, transfer function $k_d(s)$ actually contains two transfer functions, 48 and 49. Function 48 compensates the d-axis component of the error signal to produce a d axis voltage demand signal $v_d^*$. Similarly, function 49 compensates a q-axis component of the error signal to produce a q axis voltage demand signal $v_q^*$. The vector form of the demand voltage derived from compensators 45 and 46 are designated $v_1^{*\prime}$ and $v_2^{*\prime}$, respectively. These signals are then passed through vector operators 51 and 52, respectively, to produce control vector signals $v_1^*$ and $v_2^*$ in a stationary reference frame. Referring again particularly to FIG. 1, the voltage control vector signals $v_1^*$ and $v_2^*$ are then fed to the inverter modulation and firing circuit means which comprise pulse width modulators 54 and 55, respectively. A presently preferred pulse width modulator for use with the present invention is described in a concurrently filed application Ser. No. 07/870,646, entitled, "Flat-Top Waveform Generator and Pulse Width Modulator Using Same", by Colin D. Schauder. Pulse width modulators 54 and 55 output switching signals to the inverter means.

Preferably, transfer functions 48 and 49 are proportional-plus-integral controllers. Such a controller may have the following form: $k1+(k2/p.)$, where k1 and k2 are constants and p. is d/dt (or the Laplace variable "s"). The important feature of this type of controller is that it provides theoretically infinite gain for vector components having a rotational angular frequency equal to that of the reference frame. Practically, the significance of this arrangement is that there will be zero steady state error at the frequency $\omega_{syn}$ even if the proportional gain $k_1$ is very low. In other words, the controller will be able to track high frequency current references with zero fundamental error even if the closed loop control has very low bandwidth. This assumes, of course, that the inverter means has the inherent capability to produce the desired high frequency current The use of separate polyphase windings 26 and 27 in motor 14 has the further advantage of allowing inverters 56 and 57, which control the flow of power into the motor, to be split into two packages. Each of these packages can then share an equal amount of load current. This design eliminates the need to parallel discrete power semiconductor components which may be the case if the motor was of the conventional one winding design. Paralleling discrete power semiconductor components has been found to cause difficulty in that the switching time constant of the two packages is inevitably slightly different. Previously, additional components have been required to reduce the effects of time constant differentials. Such additional components are not required with the present invention.

Inverters 56 and 57 each preferably have a number of poles corresponding to the number of phases in the respective winding. Thus, in the embodiment shown, each inverter has three poles. Each pole comprises a pair of transistors or other semiconductor switching elements having respective anti parallel diodes. The transistors are serially arranged such that the collector of one is tied to a positive DC rail connected to the positive electrode 58 of battery 12. The emitter of the other is tied to a negative DC rail connected to battery negative electrode 59. The emitter of the first transistor is electrically connected to the collector of the second. The node connecting the two transistors together serves as an AC terminal. Firing signals from pulse width modulators 54 and 55 operate the transistors to produce three phase AC currents in windings 26 and 27 respectively. Because of the phase offset between current reference vector signals $i_1^*$ and $i_2^*$ the MMFs of the two windings coincide spatially within motor 14. This drive is fast and accurate, allowing operation of motor 14 at speeds approaching 12,000 revolutions per minute.

In the alternative battery charging mode, much of the same circuitry is utilized. However, switching means 10 alter the electrical paths within the drive such that battery 12 is easily and conveniently recharged. Inverter means 13 are of a reconfigurable design capable of drawing power from AC mains 24. A presently preferred reconfigurable means for this purpose is shown particularly in FIG. 3 of a concurrently filed patent application Ser. No. 07/870,644, entitled, "Reconfigurable Inverter Apparatus for Battery Powered Vehicle Drive," by Theodore M. Heinrich. This charger is capable of drawing essentially sinusoidal power from AC mains 24 generally at unity power factor. Functionally, single-pole, double-throw switches 60 and 61 are put into their respective reverse positions, thus connecting AC mains 24 to the A and B poles of inverter 57 as shown. Also, switch 62 is opened, thus disjunctioning direct electrical connection of positive electrode 58 to positive DC rail 64. Instead, the AC terminal of pole A within inverter 56 is electrically connected through diode 65 to electrode 58. Diode 65 is reverse biased with respect to electrode 58, thus preventing conduction during normal drive mode operation. In this configuration, poles A and B of inverter 57 function as an H bridge inverter, drawing power from AC mains 24 and delivering it to positive DC rail 64 as direct current, where it collects on capacitor 66. Pole A of inverter 56 then functions as a single pole chopper, drawing the DC from the capacitor at a higher voltage and delivering it to battery 12 through diode 65 at a lower voltage.

In order for the reconfigurable inverter means to function properly as a battery charger, inverters 56 and 57 should be controlled. The control should generally accomplish two functions. First, charging current should be maintained at a demanded level. Second, the current drawn from AC mains 24 should be maintained at a level just sufficient to keep the DC voltage applied to capacitor 66 at a constant value slightly higher than the peak charging voltage. To accomplish these goals, battery charging controller 22 produces a pair of charging reference signals $i_{DC}*$ and $i_{AC}*$ for inverters 56 and 57, respectively. These charging reference signals do not rotate in a rotating reference frame. The amplitude of signal $i_{AC}*$ varies sinusoidally at the frequency of AC mains 24. Signal $i_{DC}*$ is a constant vector signal. Both $i_{dc}*$ and $i_{ac}*$ are real valued in this mode, i.e., their imaginary parts are zero.

Referring to FIG. 3, switches 70 through 74 are placed by switching means 10 in their reverse positions in the battery charging mode. Here, vector operators 35, 42, 51, and 52 are set with data representing an angle of $-\pi/6$ (negative thirty degrees). Signal $i_{DC}*$ is compared with an actual charging current represented by the same vector signal $i_2$ as used in the drive mode to produce a charging error current vector signal. The charging error current vector signal is then compensated by compensator 77 to produce a charge voltage demand signal. Similarly, signal $i_{AC}*$ is compared with a signal representative of actual current drawn from AC mains 24. This actual drawn current is represented by the same measured current vector signal, $i_1$, used in the drive mode. The second charging error vector signal thus produced is compensated by compensator 79.

Figure 5:
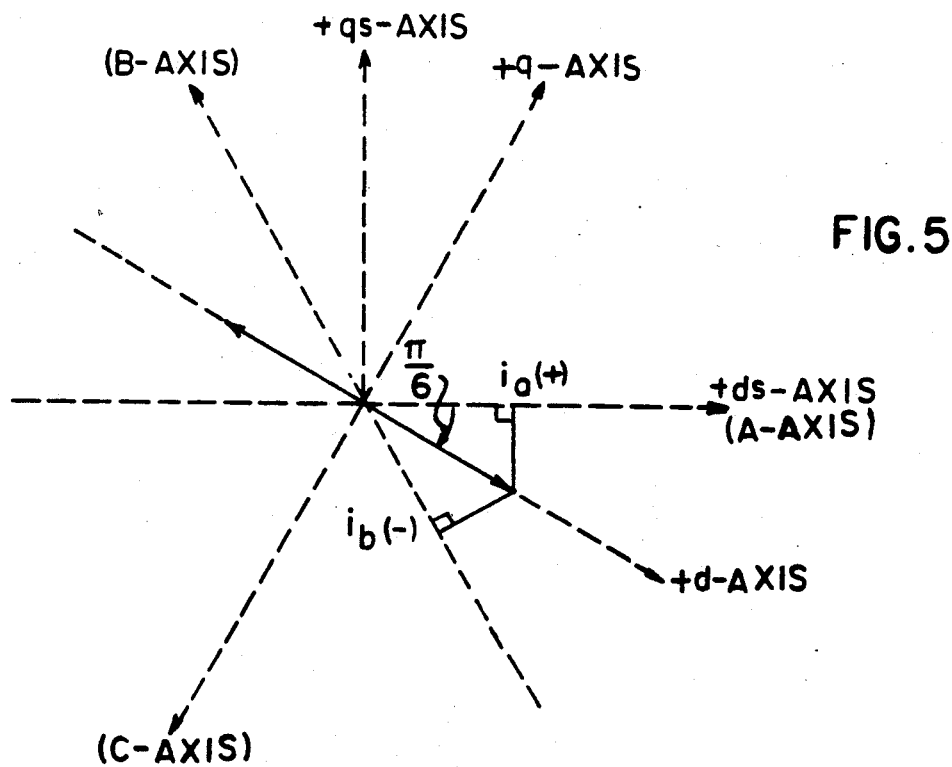
FIG. 5 is a graphical representation of inverter output currents used to charge the battery.

Referring to FIG. 5, the reasons for setting the vector operators at $-\pi/6$ are evident. The sinusoidal variation of the real-valued $i_{AC}*$ produces equal and opposite sinusoidally operating currents on poles A and B of inverter 57. Pole C receives no demand current and remains disabled as desired. Similarly, $i_{DC}*$ produces a DC current out of pole A of inverter 56. Nominally, this reference is actually asking for current return on the B pole of inverter 56. However, since this pole is disabled, and the current feedback for it is not measured directly, but inferred from the A and C phase currents, the controller is satisfied as long as the current in the A pole assumes the correct value.

Figure 6A:
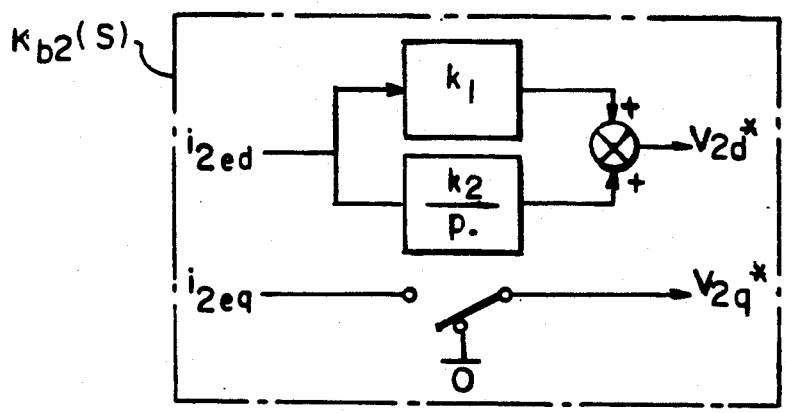
FIGS. 6A and 6B are diagrammatic representations of presently preferred transfer functions for first and second battery charging error vector signals, respectively.
Figure 6B:
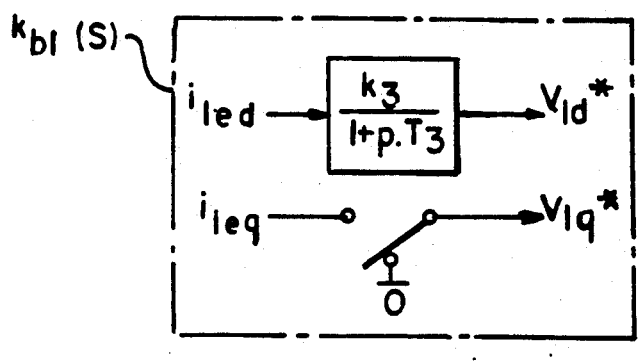

FIG. 6A illustrates the preferred transfer function $k_{b2}(s)$ of compensator 77. The d-axis component $i_{2ed}$ of the error vector signal $i_{2e}$ is compensated using a proportional-plus-integral transfer function $k_1+(k_2/p.)$ to derive a demand voltage $v_{2d}*$. As is evident in FIG. 5, the q axis component $v_{2q}*$ of the demand voltage vector $v_2*$ should preferably always be zero. Thus, the output for this component is grounded. The transfer function $k_{b1}(S)$ of compensator 79 is illustrated in FIG. 6B. The d axis of the error vector signal $i_{1ed}$ is compensated using a lag network transfer function having the value $k_3/(1+p.T_3)$ to give a d-component $v_{1d}*$ of the demand voltage signal $v_1*$. The factor $k_3$ is a constant and $T_3$ is a time constant providing sufficient filtering action. The q-axis component $v_{1q}*$ of demand voltage vector signal $v_1*$ is set to zero. The voltage control vector signals $v_1*$ and $v_2*$ are then input into pulse width modulators 54 and 55, respectfully. Pulse width modulators 54 and 55 generate switching signals to perform battery charging.

The invention thus provides a drive system for a battery powered vehicle which is selectively operable in either a normal drive mode or an alternative battery charging mode. The system is compatible with either 110 or 220 volt charging voltages. Furthermore, virtually any charging frequency can be accommodated. The invention utilizes a unique AC induction motor having separately excitable polyphase windings which are spatially separated preferably by an angle of 30 e°. In the drive mode, the apparatus is capable of fast and accurate response over a wide range of torque and speed demands. The invention also reduces weight, since much of the same circuitry is utilized for battery charging purposes.

Although certain preferred embodiments have been described and shown herein, it is to be understood that various other embodiments and modifications can be made within the scope of the following claims.

I claim: CLAIMS:

1. A reconfigurable battery-powered vehicle drive control selectively operable in either a drive mode to supply an AC induction motor or an alternative battery-charging mode, said control comprising:

switching means for providing selective electrical interconnection to operate said control in a drive mode or an alternative battery-charging mode;

reconfigurable inverter means connectable to at least one battery for operation in said drive mode to invert direct current from said battery to a polyphase alternating current to drive said motor, said inverter means further connectable in said alternative battery-charging mode to a source of AC energy for supplying charging current to said battery;

firing circuit means for providing switching signals to operate said reconfigurable inverter means;

a motor torque and flux controller operable in said drive mode to produce at least one drive reference vector signal and a slip angle signal;

a battery-charging controller operable in said alternative battery-charging mode to produce at least two charging reference vector signals; and reconfigurable compensation means for processing signals from said controllers, said compensation means including differencing means for use in said drive mode to produce at least one drive error vector signal based on a difference between said at least one drive reference vector signal and a signal representative of actual conditions in said motor, said differencing means for use in said alternative battery-charging mode to produce at least two battery charging error signals based on a difference between said charging reference signals and signals representative of actual charging conditions, said compensation means further including compensators for receiving signals from said differencing means and producing control signals to operate said firing circuit means.

2. The control of claim 1 wherein a first of said at least two charging reference vector signals has an amplitude varying sinusoidally at a frequency equal to the frequency of said source of AC energy.

3. The control of claim 2 wherein said compensators include a first battery charging compensator to compensate said first charging reference signal and a second battery charging compensator to compensate a second of said at least two charging reference signals.

4. The control of claim 3 wherein said battery charging compensators each have a transfer function to compensate a d axis component of said battery charging error vector signals and wherein a q-axis of said control vector signals is grounded in said alternative battery-charging mode.

5. The control of claim 4 wherein said first battery charging compensator has a d axis component transfer function having a first order lag characteristic and wherein said second battery charging compensator has a proportional-plus-integral transfer function.

6. The control of claim 1 wherein said AC induction motor has a pair of separately excitable polyphase windings mutually displaced by a predetermined angle, said reconfigurable inverter means including a first inverter for driving a first of said pair of polyphase windings and a second inverter for driving a second of said pair of polyphase windings.

7. The control of claim 6 wherein said pair of polyphase windings are mutually displaced spatially in said stator by thirty electrical degrees.

8. The control of claim 1 wherein said compensation means is functional in said drive mode in a reference frame rotating with a frequency proportional to an angular velocity of said rotor plus a slip frequency.

9. The control of claim 1 wherein said compensation means further operates in said alternative battery-charging mode to rotate said control signals by an angle of negative thirty degrees in a stationary reference frame.

10. A battery-powered vehicle drive using an AC induction motor, said drive comprising:
an AC induction motor having a pair of separately excitable polyphase windings mutually displaced by a predetermined angle;
a motor torque and flux controller operable in a rotating reference frame to produce a pair of drive reference vector signals having a phase difference generally equal to said predetermined angle, said controller further producing a slip angle signal;
first and second differencing circuits respectively producing first and second drive error vector signals based on a difference between said drive reference vector signals and signals representative of actual respective currents in said pair of polyphase windings;
first and second compensators respectively compensating said drive error vector signals and producing output control signals, said compensators further comprising vector operators to transform said rotating reference frame to a stationary reference frame;
first and second firing circuits respectively receiving said output control signals and producing first and a second switching signals; and
first and second inverters connectable to at least one battery, said inverters respectively receiving said switching signals from said first and second firing circuits, said inverters further inverting direct current from said battery to polyphase alternating currents to respectively excite first and second windings of said pair of polyphase windings such that generally coinciding magnomotive forces are produced by said windings.

11. The drive of claim 10 wherein said first and second firing circuits are pulse width modulators.

12. The drive of claim 10 wherein said predetermined angle is thirty electrical degrees.

13. The drive of claim 10 wherein said first and second compensators each have a first drive mode transfer function to compensate a d axis component of said drive error vector signals and a second drive mode transfer function to compensate a q axis component of said drive error vector signals.

14. The drive of claim 13 wherein said first and second drive mode transfer functions are proportional-plus-integral transfer functions.

15. The drive of claim 10 further comprising:
switching means for providing selective electrical interconnection to operate said drive in a normal drive mode or an alternative battery charging mode;
a battery charging controller operating in said alternative battery-charging mode to respectively supply a pair of charging reference signals to said first and second differencing circuits; and
said inverters further reconfigurable in said alternative battery-charging mode to receive AC from a source of AC energy and convert it to DC to charge said battery.

* * * * *